(12) United States Patent
Tecu et al.

(10) Patent No.: US 11,719,538 B2
(45) Date of Patent: Aug. 8, 2023

(54) SINGLE USER PLOT MEASUREMENT SYSTEM

(71) Applicants: Kirk Steven Tecu, Longmont, CO (US); Duncan Doyle, Denver, CO (US); Sean Michael Shiers, Mead, CO (US)

(72) Inventors: Kirk Steven Tecu, Longmont, CO (US); Duncan Doyle, Denver, CO (US); Sean Michael Shiers, Mead, CO (US)

( * ) Notice: Subject to any disclaimer, the term of this patent is extended or adjusted under 35 U.S.C. 154(b) by 120 days.

(21) Appl. No.: 17/492,225

(22) Filed: Oct. 1, 2021

(65) Prior Publication Data

US 2023/0107900 A1 Apr. 6, 2023

(51) Int. Cl.
*G01C 15/06* (2006.01)
*G01B 3/1084* (2020.01)
*H04W 4/02* (2018.01)

(52) U.S. Cl.
CPC .......... *G01C 15/06* (2013.01); *G01B 3/1084* (2013.01); *H04W 4/026* (2013.01)

(58) Field of Classification Search
USPC .......... 33/293, 1 G, 758, 759, 760, 763, 764
See application file for complete search history.

(56) References Cited

U.S. PATENT DOCUMENTS

| | | | | |
|---|---|---|---|---|
| 2,586,074 A | * | 2/1952 | Memluck | G01C 15/00 33/1 LE |
| 5,371,949 A | * | 12/1994 | Delaurier | A63C 19/065 33/1 G |
| 7,788,815 B2 | * | 9/2010 | Yandrick | G01C 15/06 33/294 |
| 7,870,679 B2 | * | 1/2011 | Lee | G01B 3/10 33/770 |
| 8,966,774 B2 | * | 3/2015 | Choi | G01C 15/04 33/1 G |
| 10,634,476 B1 | * | 4/2020 | Bautista | G01C 15/004 |
| 10,926,576 B2 | * | 2/2021 | Franco | B44D 3/38 |
| 10,981,042 B2 | * | 4/2021 | Parker | A63B 1/00 |
| 2005/0223582 A1 | * | 10/2005 | Baugh | G01B 3/1003 33/764 |
| 2006/0010705 A1 | * | 1/2006 | Dettellis | G01B 3/11 33/756 |
| 2016/0252349 A1 | * | 9/2016 | Egan | E04G 21/00 33/413 |
| 2021/0131781 A1 | * | 5/2021 | Bridges | G01B 3/1056 |
| 2022/0120549 A1 | * | 4/2022 | Rizvi | G01B 3/1071 |

FOREIGN PATENT DOCUMENTS

FR 2939598 A1 * 6/2010 ............. B65H 75/48

* cited by examiner

Primary Examiner — Christopher W Fulton (57) ABSTRACT

A plot measurement system which enables a user to single-handedly mark boundaries and features of a sports field or construction site with improved accuracy. The system utilizes a plurality of vertex markers connected by measuring leaders to provide triangulation. A three-vertex marker system can be used to construct triangles, which can then be used to construct any n-sided shape. The concept is scalable and a four-vertex marker system is presented to quickly construct quadrangle plots such as an endzone. The disclosure presents mechanical and electrical systems.

14 Claims, 12 Drawing Sheets

SINGLE USER PLOT MEASUREMENT SYSTEM

TECHNICAL FIELD

This disclosure is related to field marking and surveying.

BACKGROUND OF THE DISCLOSURE

To adhere to proper field setup prior to playing a field game such as football, lacrosse, soccer, or the like, a facility is required to measure and mark geometric dimensions (e.g., stake out a plot plan, mark a football field's sidelines, etc.). Typically, more than one person is required to measure and mark the proper locations based on the established layout and dimensions of the field. Performing the layout and measurements single-handedly using existing tools (tape measure, stakes, strings, etc.) is a challenge. A similar challenge arises when a construction worker needs to stake out a plot on a dirt field and no other coworkers are available to help measure and mark.

Presented herein is a system and method which allows these tasks to be completed by a single person with an improved degree of accuracy while saving time and money. The system includes a plurality of vertex markers connected by multiple measurement devices (e.g., measuring tapes) to facilitate the triangulation, identification, and location of points of interest on the field. The vertex markers include mechanical features to provide an attachment method to the surface of interest (e.g., stakes hammered into dirt ground). By triangulating and securing the vertex markers into position, a single user can layout a field or worksite.

A three-vertex marker system can be used to construct triangles, which can then be used to construct any n-sided shape. The concept is scalable and a four-vertex marker system is presented to quickly construct quadrangle plots such as an endzone.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure but are intended to be illustrative only.

DETAILED DESCRIPTION OF EMBODIMENTS

This disclosure provides detailed descriptions of inventive concepts and improvements which are applicable, but not limited to, a plot measurement system utilizing a plurality of retractable measuring devices. Some large-scale concepts presented herein for the plot measurement system include field layout, such as football or lacrosse, or marking boundaries for construction or landscaping. The concepts presented, however, are scalable and may therefore also extend to smaller systems. Additionally, the plot measurement system may be used to either create a pre-determined layout or be used as a measurement tool to measure unknown geometries.

Generally, creating an accurate layout of a large sports field or construction site requires multiple users to manipulate measuring tapes, estimating angles over large distances, and then a series of adjustments to confirm symmetry. Failure to establish proper markings can have a compounding effect as the fields get more complex. By using a system of placement markers connected by multiple integrated measurement devices, a single user can quickly and accurately complete the field layout.

Figure 1:
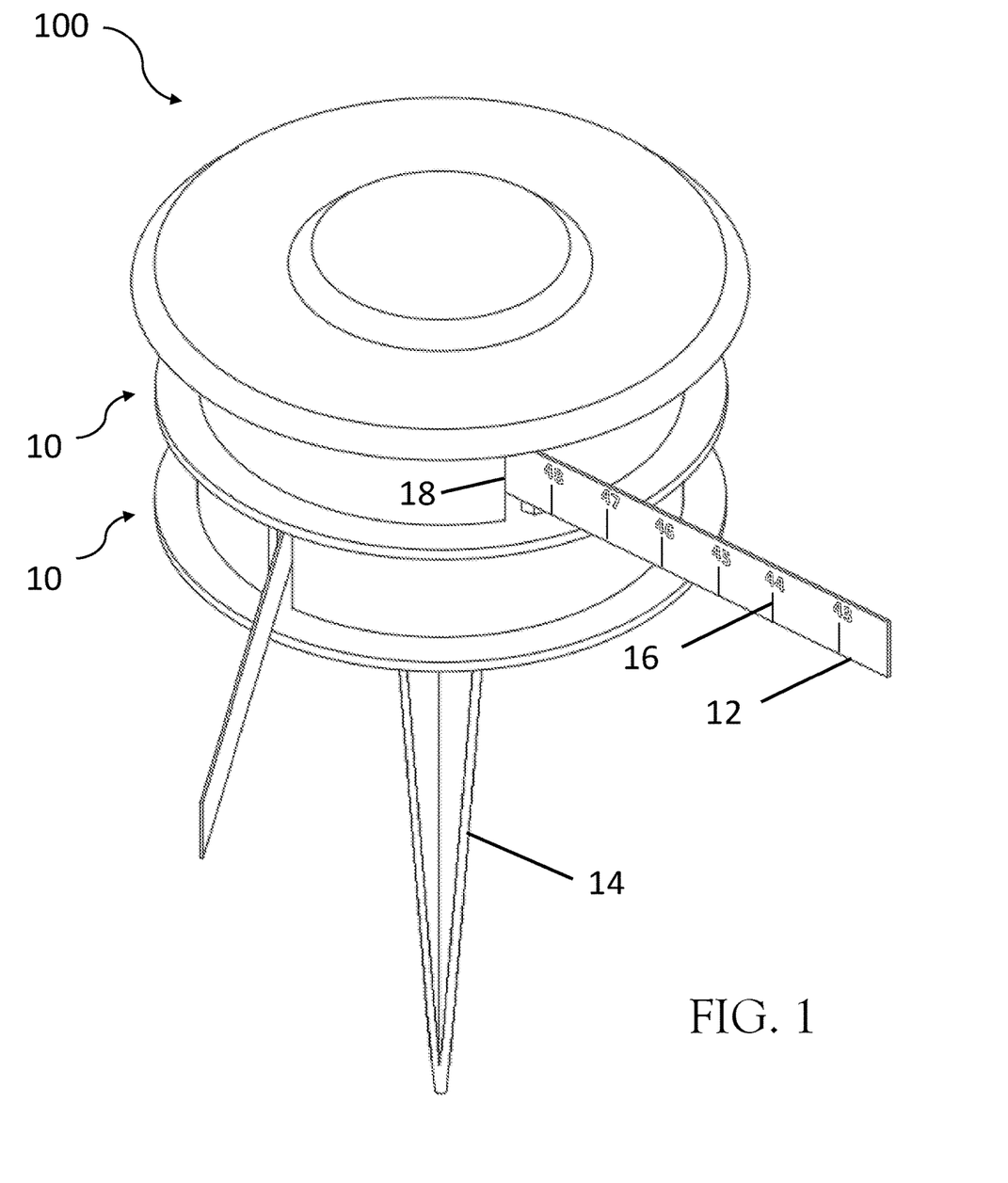
FIG. 1 shows an isometric view of a vertex marker corresponding to an embodiment of the present disclosure.

An example of a placement marker, herein a vertex marker 100, is shown in FIG. 1. The vertex marker 100 may be configured differently depending on the purpose, but generally the vertex marker comprises a plurality of measurement reels 10 axially located upon to a concentric mechanism from which the measurement either begins (i.e., originates) or ends (i.e., terminates). The concentric mechanism shown in FIG. 1 is configured as a rod extending from a stake 14 which may be driven into the ground during measurement to secure the vertex marker.

Extending from each measurement reel is a leader 12. In most cases the leader 12 will have a series of marking or indicia 16 such as a tape measure. In a preferred embodiment, the indicia may include ticks and/or alpha-numerical values which can be read at the leader egress 18 to indicate distance between points. Electronic systems may incorporate optical or mechanical indicia which may be read by sensors. Although not shown in FIG. 1, to complete the system, each leader continues until it terminates at a subsequent vertex marker 100.

A 2-reel vertex marker is shown in FIG. 1, although in some cases, additional reels may expand the utility of the plot measurement system. As stated earlier, the vertex marker 100 may also be configured differently based on requirements—and more specifically the combination of reels on the vertex marker may be configured differently to support either a fixed origin of the leader or a retractable reel at the termination of the leader where the length of the leader may be obtained.

Figure 2A:
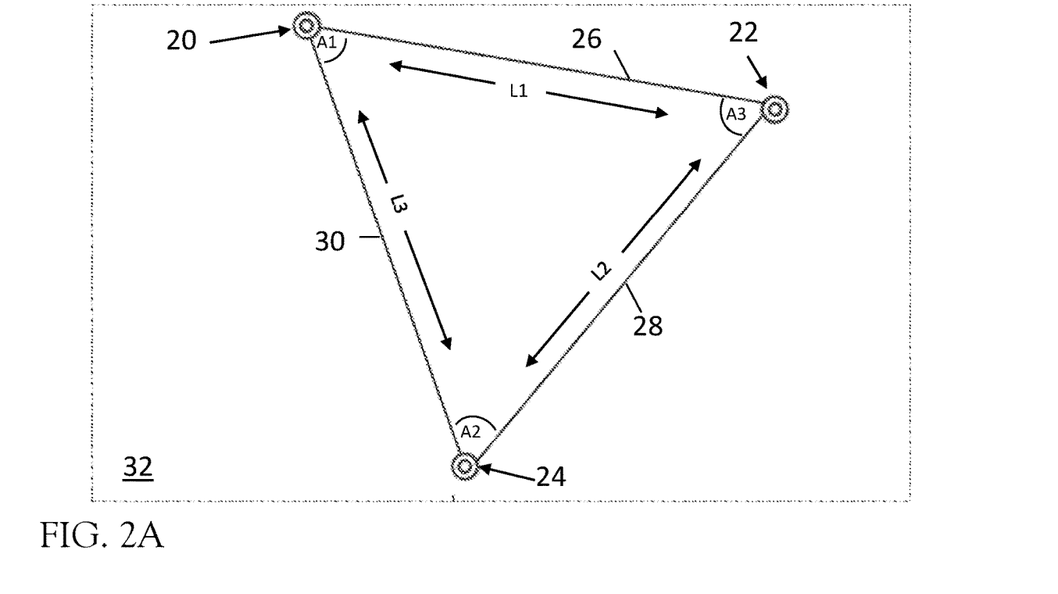
FIG. 2A and FIG. 2B show an overhead and isometric view of a plot measurement system using a plurality of vertex markers to inscribe a triangle corresponding to an embodiment of the present disclosure.
Figure 2B:
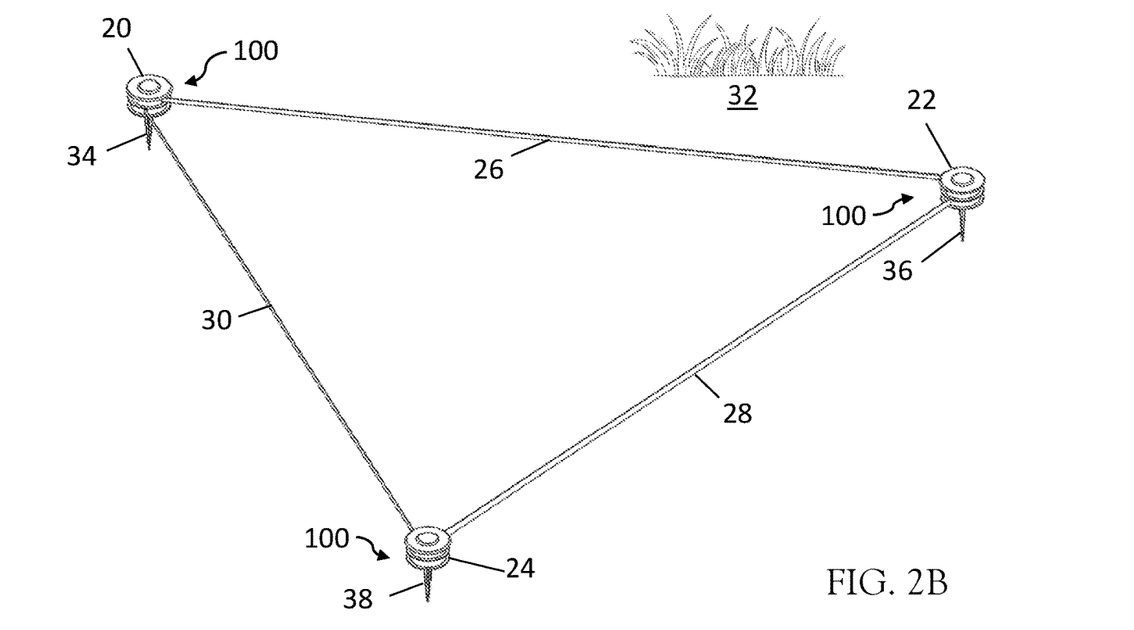

To facilitate a higher-level understanding of the complete system, FIGS. 2A and 2B present a completed system consisting of three vertex markers (20, 22, and 24) connected by three leaders (26, 28, and 30). In this example the user wishes to inscribe a predetermined triangular geometry on to an area of land, ground, or field 32. The triangle has three legs having lengths L1, L2, and L3 and subsequently by definition, three angles exist, A1, A2, and A3.

The triangular geometry allows for creation of any number of polygons, including squares, rectangles, hexagons, etc., as well as, defining by triangulation, the location of any vertex relative to two other points.

Continuing with the example shown in FIGS. 2A and 2B, a user in this case has prior knowledge that the lengths required for L1, L2, and L3 are 7 meters, 4.5 meters, and 6 meters respectively. The user initially places the concentric mechanism or in this case, spike 34 of the first vertex marker 20 into the ground at any point in the field 32 to establish a first point. Leader 26 spans between the first vertex marker 20 and the second vertex marker 22. The leader deploys from the second vertex marker 22 and indicia appearing on the leader is configured to display the distance between the spike of the first vertex marker and second vertex marker. In the preferred embodiment, the measurement may be read by the visible indicia at the point of deployment of the leader 26 like a tape measure, and additionally, the indicia may be compensated to account for the distance from the point of deployment and the center of the spike. Once the measurement of leader 26 equals the desired length of L1 (in this case 7 meters), the second vertex marker 22 may be secured using spike 36 of the second vertex marker 22—thereby establishing a reference line of 7 meters between the first and second vertex markers. For this example, it is important to note that the second vertex marker is the origin of leader 28.

To establish the location of the third vertex marker, the process is repeated such that the leader 28 is deployed from the third vertex marker until it reaches a length of L2 or 4.5 meters, and then the leader 30 is deployed from the third vertex marker 24 until it reaches a length of L3 or 6 meters. While the sequence of events in placing the third vertex marker are described as leader 28 being deployed followed by leader 30, it should be understood that these leaders are likely being deployed simultaneously from the reels of the third vertex marker as the user moves the vertex marker towards the desired position. Also, the user may reach the distance of L3 prior to reaching the distance of L2. Once the third vertex marker is in position—as defined by leader 28 and leader 30 being deployed the intended amount, the spike 38 for the third vertex marker 24 may be placed into the field 32.

By using standard geometric relationships, provided a combination of at least one length (to establish scale), and two additional defining dimensions including either lengths or angles of the triangle, the location of each vertex can be established. Defining geometric parameters for the triangle displayed in FIG. 2 where L1 equals 7.0 meters, L2 equals 4.5 meters, and L3 equals 6.0 meters. The resulting angles for each vertex are then computed as A1 equals 39.6°, A2 equals 82.3°, and A3 equals 58.1°.

An overly simplified view of FIG. 2B would assume that each of the three vertex markers 100 that create the system are identical in construction, however, there can be different reel type combinations at each vertex marker based upon how it manages the leader. There are two types of reels, an origin reel and a retractable reel, and for a two-reel system as shown in FIG. 2B there can be three different types of vertex markers 100. The origin reel is defined as being the reel from which the leader originates, and the indicia begins at a distance of zero relative to the concentric mechanism. The retractable reel is defined as being the reel from which the leader may be retracted and deployed, and the indicia indicates the distance between the concentric mechanism of the origin reel and the concentric mechanism of the retractable reel.

A vertex marker comprising only origin reels is herein referred to as an origin vertex marker. A vertex marker comprising a combination of origin and retractable reels is herein referred to as a mixed vertex marker. Finally, a vertex marker comprising only retractable reels is herein referred to as a retracting vertex marker.

As stated earlier a triangular plot measurement system such as shown in FIGS. 2A and 2B may be made of various combinations. In a preferred embodiment, such as presented in the previous example, the first vertex marker 20 would be the origination point for leader 26 and leader 30 and therefore utilize a origin vertex marker; the second vertex marker 22 would be a mixed vertex marker where leader 26 terminates upon a retractable reel and leader 28 originates on a origin reel and therefore utilize a mixed vertex marker; and the third vertex marker 24 would be a retracting vertex marker where leader 30 and leader 28 both terminate. The advantage of this configuration is the ability for the third vertex marker 24 to be easily positioned while enabling the user to read the lengths L2 and L3.

An example of an alternative system embodiment would include a configuration where each of the vertex markers 20, 22, and 24 are mixed vertex markers. In this configuration, each vertex marker would terminate a previous leader and originate the next leader. While this configuration is within the scope of the invention and is capable of accomplishing the task, the placement of the third vertex marker 24 is challenging as the measurement of the third leg is only available at the first vertex marker. Systems which incorporate electronics to support the ability to remotely ascertain the lengths of each leader without needing to view indicia at the leader egress may enable additional configurations, and be beneficial in more complex systems such as those using additional vertex markers.

Figure 3:
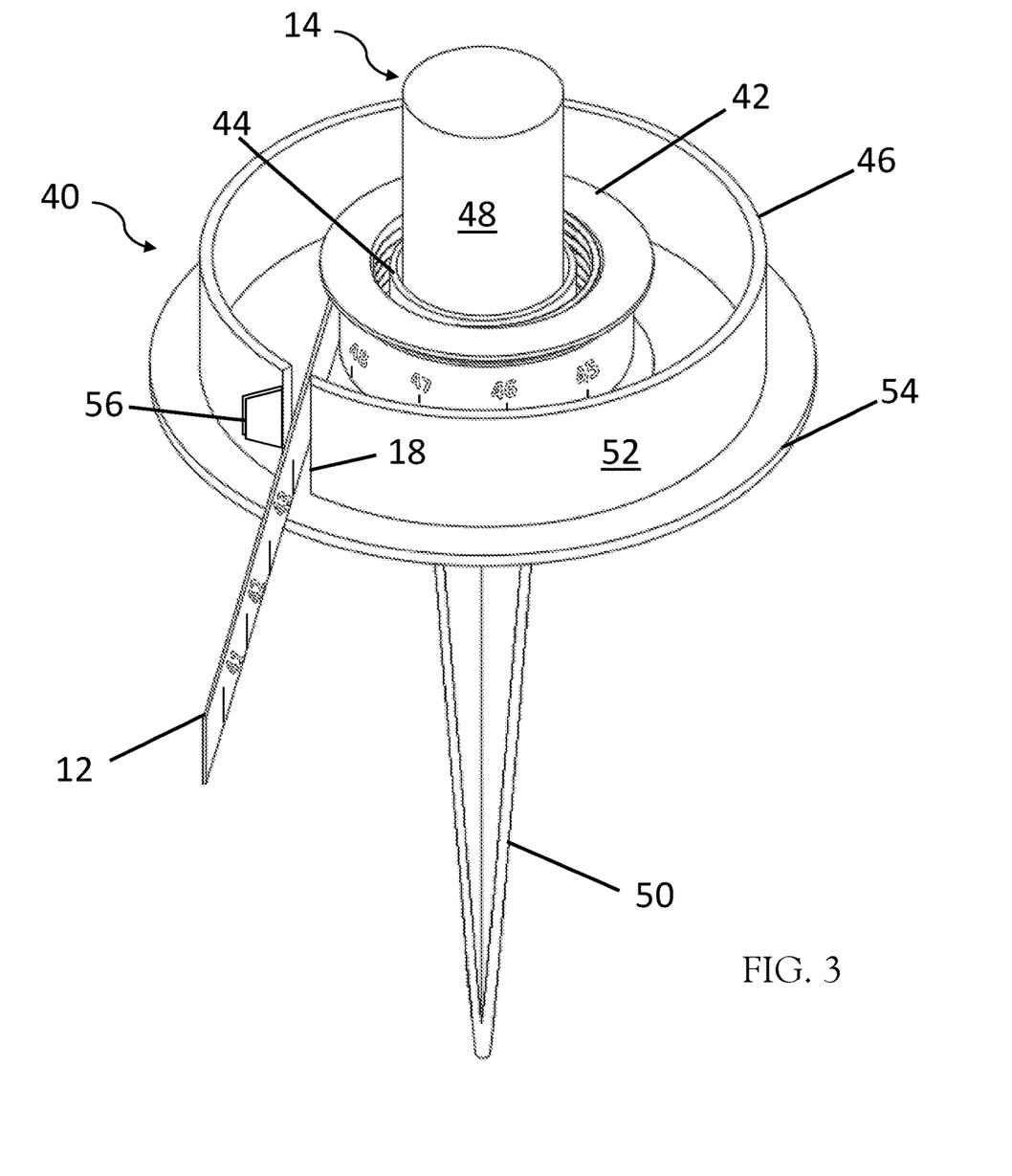
FIG. 3 shows a cutaway view of a retractable measuring tape corresponding to an embodiment of the present disclosure.

FIG. 3 shows a retractable reel 40 positioned on a concentric mechanism 14. The retractable reel includes a leader 12 wound around a spool 42. The leader passes through the reel housing 46 through the leader egress 18. As the retractable reel is the point of measurement, the indicia relating to the distance between the retractable reel 40 and the opposing origin reel (not shown) of the leader 12, is read at the leader egress. The spool 42 is in communication with the rod 48 by a spring. The spring increases in tension as the leader is pulled or extended from the spool, and in turn, causes slack within the leader to be retracted around the spool and into the housing. The concentric mechanism 14, as shown, includes a rod 48 which terminates into a stake 50.

The reel housing 46 is shown having vertical walls 52 rising from a platform 54. In some embodiments the reel housing may include a mechanical or electrical locking mechanism 56 to secure the leader from being further extended or retracted. In a preferred embodiment of the mechanical locking arrangement, the mechanical locking mechanism 56 may be a friction locking device which pinches the leader 12 to either the spool 42 or the reel housing 46. An alternative arrangement for the mechanical locking mechanism may secure the spool to the rod 48. An important element of the reel housing and the leader egress is its ability to rotate axially around the concentric mechanism 14 and freely in relation to another reel on the vertex marker, thereby allowing each leader to exit the reel housing in any direction.

Figure 4:
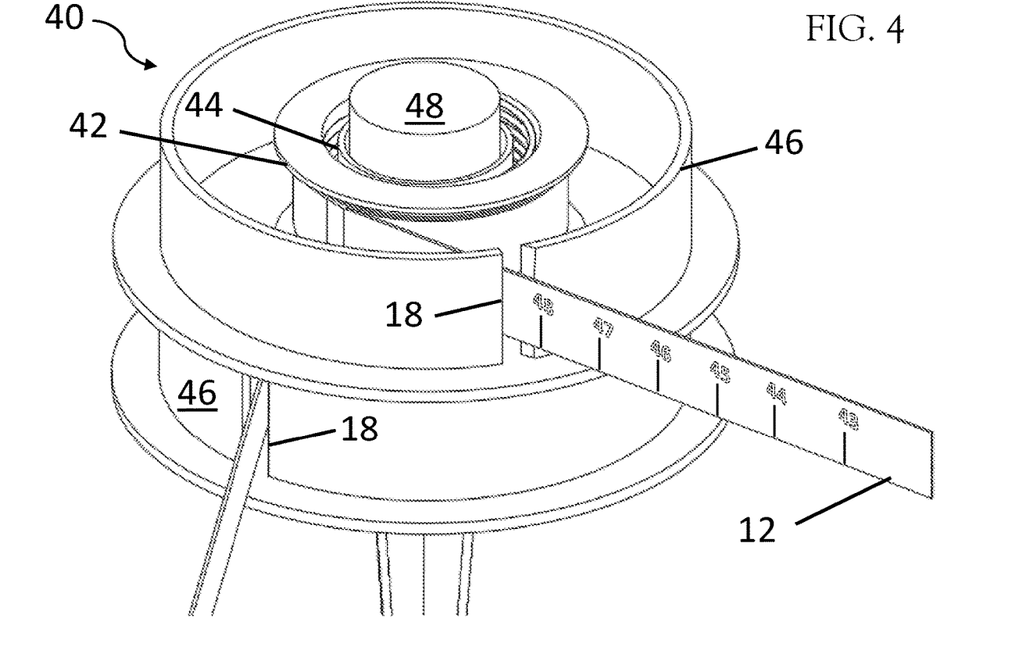
FIG. 4 shows vertex marker with two reels including a retractable reel corresponding to an embodiment of the present disclosure.

FIG. 4 further expands on the vertex marker shown in FIG. 3, by displaying a retractable second reel on top of a first reel. The retractable reel again includes a spool 42 and a spring 44. Key features of the first- and second-reel housing 46 include the ability to rotate independently of each other around the rod 48 of the concentric mechanism, thereby allowing the leader 12 to extend through the leader egress 18 in any direction. This feature of independent rotation extends to systems where the vertex markers contain two or more reels.

Figure 5:
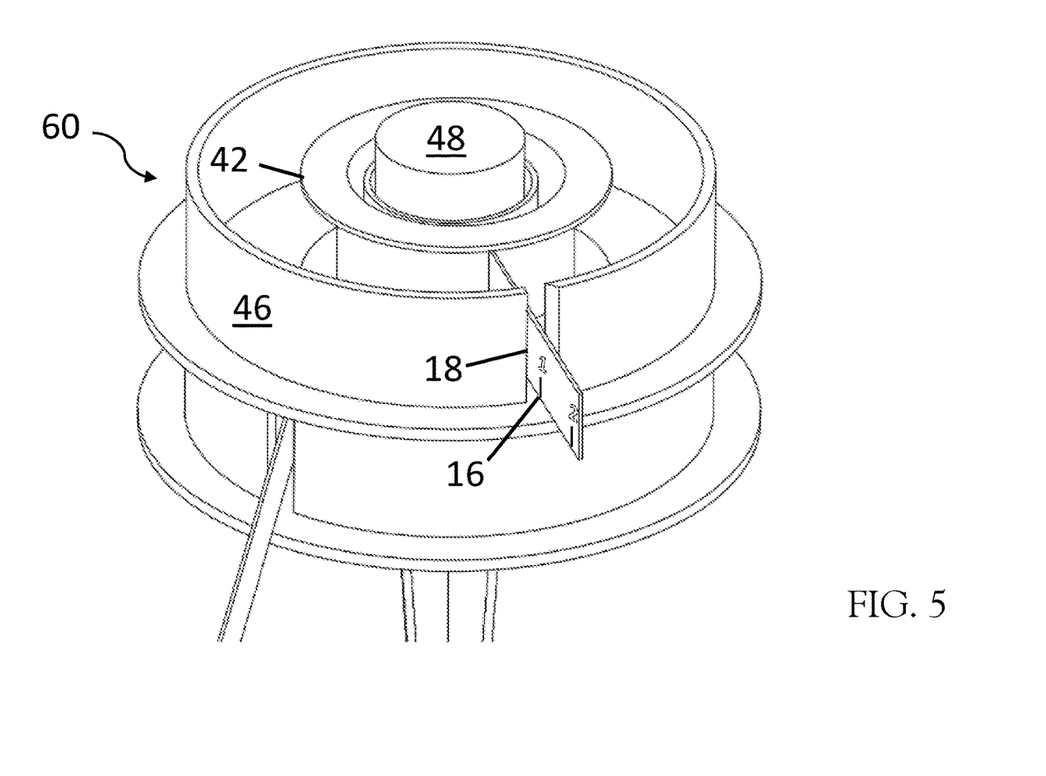
FIG. 5 shows vertex marker with two reels including an origin reel corresponding to an embodiment of the present disclosure.

FIG. 5 shows an origin reel 60 configured on the rod 48 of a concentric mechanism. Unlike the retracting reel, the origin reel has a spool 42 which rotates freely around the rod 48 without a spring to encourage retraction. In some embodiments, the spool may be integrated into the reel housing 46. Also, unique to the origin reel is the concept that the indicia at the leader egress is fixed. In the preferred embodiment, the value of the indicia at the leader egress is calibrated to twice the distance between the center of the concentric mechanism and the leader egress in order to account for the on-center distance of both a first (originating) vertex marker and a second (terminating) vertex marker.

Figure 6:
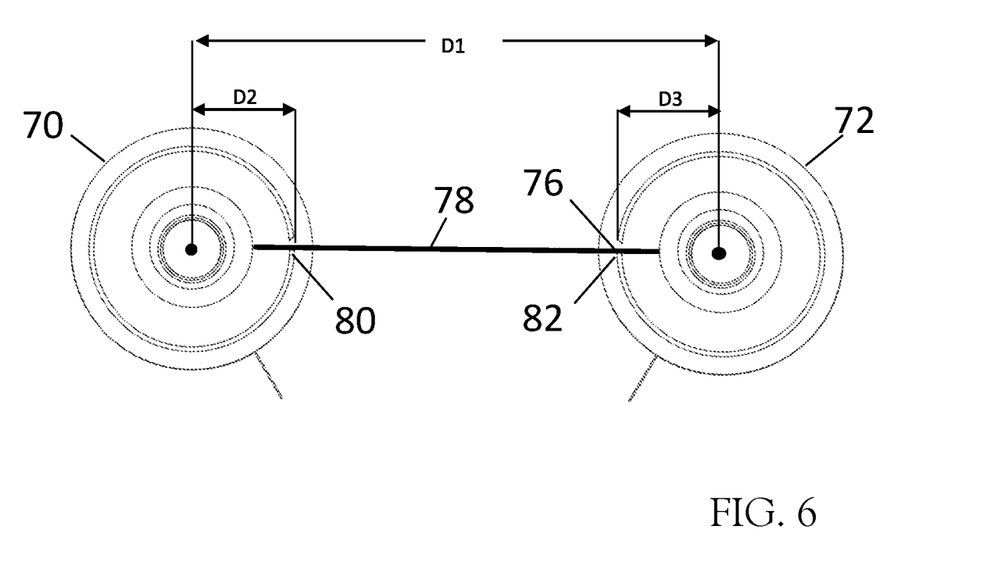
FIG. 6 illustrates the calculation and calibration of the indicia value on the leader at the origin reel corresponding to an embodiment of the present disclosure.

FIG. 6 further describes in detail the calibration of the indicia value on the leader as it appears at the origin reel egress in the preferred embodiment. In FIG. 6, D1 indicates the true length between center points of the origin reel 70 of a first vertex marker and the retracting reel 72 of a second vertex marker. The value D2 is equivalent to the distance from the center point of the origin reel 70 and the leader egress 80 of the origin reel, and likewise, D3 is equivalent to the distance from the center point of the retracting reel 72 and the leader egress 82 of the retracting reel. It is assumed in the preferred embodiment that the indicia of the leader 78 is uniformly spaced across the entirety of the leader. In order for the indicia 76 of the leader 78 to properly display the center-to-center distance D1 at the retracting reel's leader egress 82, the value of the indicia at the origin reel's leader egress 80 must begin with an offset value equivalent to D2 plus D3.

Figure 7:
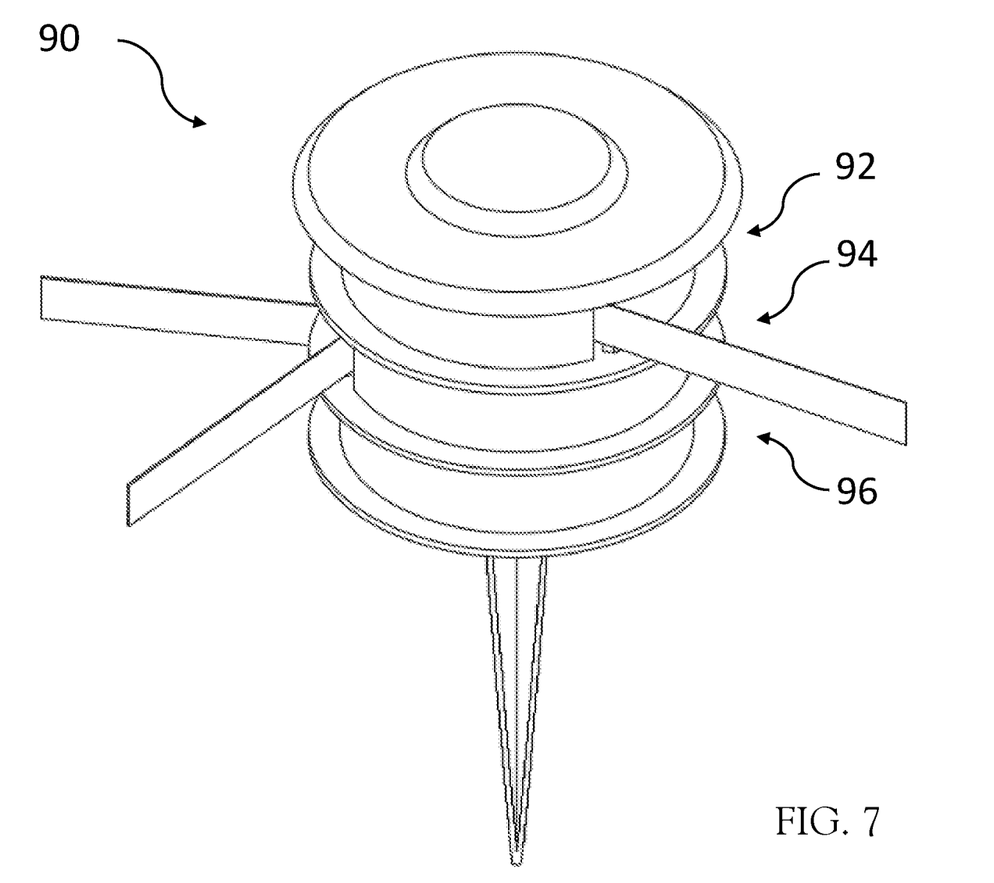
FIG. 7 shows a three-reel vertex marker corresponding to an embodiment of the present disclosure.

FIG. 7 shows a further extension of the plot measurement system utilizing a three-reel vertex marker 90. As shown, the three-reel vertex marker utilizes three reels designated as reel one, reel two, and reel three (92, 94, and 96 respectively). Similar to the two-reel vertex marker, each reel may be either an origin reel or retractable reel. Also, naming conventions remain consistent whereas a three-reel vertex marker comprising only origin reels is still referred to as an origin vertex marker. A three-reel vertex marker comprising a combination of origin and retractable reels is still referred to as a mixed vertex marker. Finally, a three-reel vertex marker comprising only retractable reels is still a retracting vertex marker. Various combinations of vertex markers, including combined two- and three-reel vertex markers, can be used to make a plot system and the preferred embodiment is dependent upon the application.

Figure 8A:
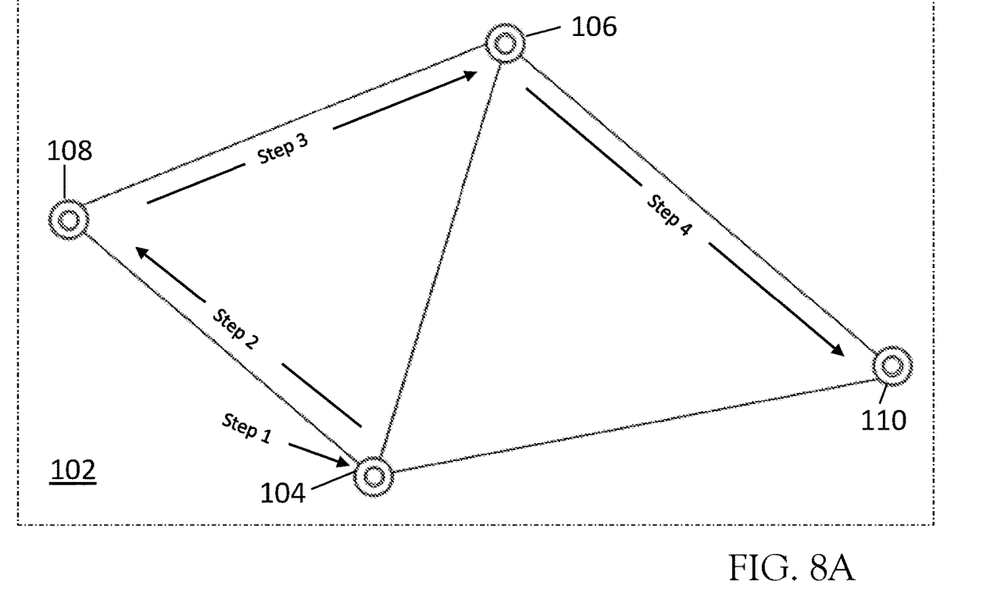
FIG. 8A and FIG. 8B show an overhead and isometric view of a plot measurement system using a plurality of three-reel vertex markers to inscribe a quadrangle corresponding in a field to an embodiment of the present disclosure.
Figure 8B:
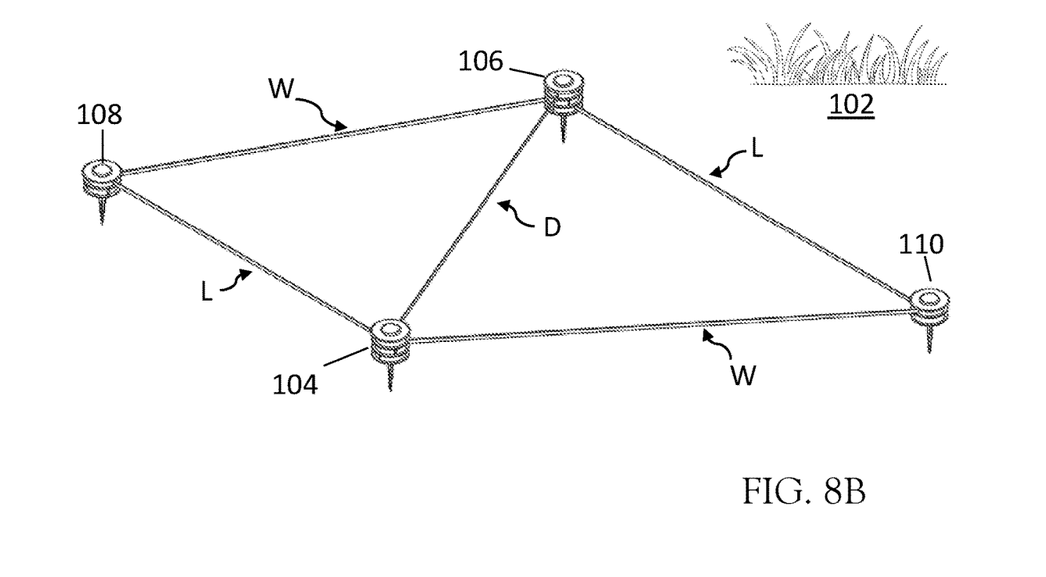

FIG. 8A and FIG. 8B illustrate the application of the combined two- and three-reel vertex marker systems. While the two-reel vertex marker system enables the ability to layout any shape through triangularization, the additional three-reel vertex markers may enable a slightly faster method for drawing out squares, rectangles, and other quadrilateral polygons in fields as positioning can be completed and then marked (e.g., sprayed with paint or chalk) without making any other adjustments.

To quickly create a rectangular endzone with a known length (L), width (W), and diagonal (D) value in a field 102, for example, the preferred embodiment of the plot measurement system would comprise a triple origin vertex marker 104, a double mixed reel 108, a triple mixed reel 106, and a double retractable reel 110. Step one includes placing the triple origin vertex marker 104 in the field 102 to establish an origin. With knowledge of the length value (L), step 2 includes traversing the distance of the length and placing the double mixed reel vertex marker 108 in the field. The third step includes positioning the triple mixed reel vertex marker 106 at the point where the width (W) and diagonal (D) of the triangle are read at the leader egresses of the vertex marker 106. Subsequently, as the fourth step, the double retractable vertex marker 110 is then positioned opposite the diagonal where the length (L) and width (W) are read at the leader egresses of the vertex marker 110.

Figure 9:
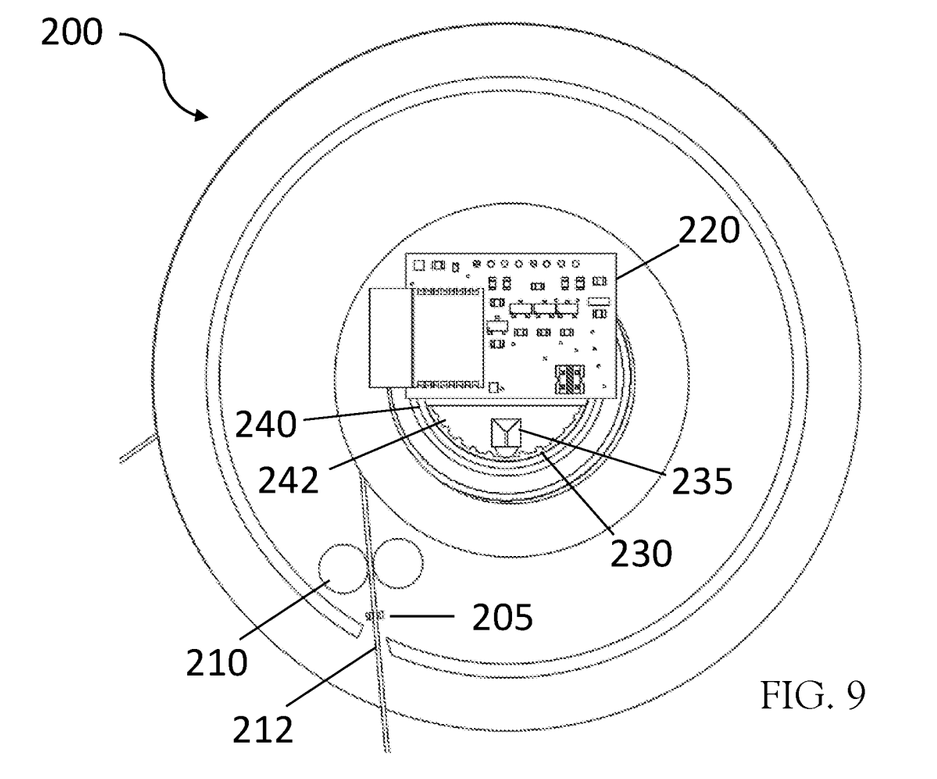
FIG. 9 shows a construction of the concentric mechanism utilizing electronic sensors corresponding to an embodiment of the present disclosure.

FIG. 9 shows a vertex marker 200 equipped with a suite of electronic sensors and a logic board 220. A key element of the present invention is presenting a user with an awareness of how much of the tape has been deployed from each reel. Given the arrangement shown, the electronic sensors provide means to determine the amount of tape which has been deployed from the reel—and deliver that information to a logic board. The logic board may present that information via a local display or, in the preferred embodiment, transmit the information wirelessly to a receiver such as a smart phone.

The use of electrical sensors also enables a wide variety of leader types as opposed to a more traditional wide steel-ruled measuring tape with numerical and hash mark indicia. Various sensor types are disclosed including linear and rotational mechanical sensors which, as presented herein, can determine distance of a tape, line, string, or other medium without the use of indicia. For example, a non-stretching snap line (with no measurement tick marks) could suffice. In other embodiments, optical sensors are presented which may rely on indicia other than numerical (e.g., holes, ticks, etc.) on the leader or within the reel to determine distance or the amount of tape which is deployed.

While this configuration is shown on one reel, it is presented that one or more reels of a vertex marker in the system may be configured in this manner. In the preferred system embodiment, the electronic sensors are utilized for determining distance at the retracting reel of the system. In some embodiments, the origin reel may still utilize electronics including a logic board to identify the originating point of the vertex marker.

To say it another way, a system may comprise at least three vertex markers (namely a first vertex marker, second vertex marker, and third vertex marker), where the vertex markers are connected in pairs by a leader traversing between an originating reel of a first marker and a retractable reel of a second marker, and where the retractable reel may utilize electronics sensors which are configured to determine the distance between the first and second vertex marker. Furthermore, this distance may be provided to a logic board local to the vertex marker possessing the retractable reel for transmission to a receiver such as a smartphone or mobile device. Said mobile device comprising a wireless receiver and display.

Various measurement sensors may be employed to accomplish this task. Several configurations are shown in FIG. 9 which enable measurement of, and thereby computing by the logic board, the length of tape deployed from the body of the tape measure. One method to measure the amount of tape which has been deployed includes measuring the rotation of the spool 240 in relation to the center hub 242. The second configuration of measurement includes a linear measurement of the tape moving or traversing across a sensor (herein linear sensor) as it is being deployed or retracted.

In the rotational measurement configuration, one type of rotational sensor 230 which enables the calculation of the amount of tape deployed may be a mechanical encoder.

An alternate embodiment for rotational measurement may utilize the spool 240 itself to act as the disk of the encoder. In this alternate embodiment, the sensor may comprise a series of holes, magnets, or visual indica as rotation orientational features 242 on the spool. In such an embodiment a pickup sensor 235, such as an optical sensor for detecting the holes/visual indica or hall effect sensor for magnets, may serve as the rotational sensor.

In the linear measurement configuration, a mechanical linear sensor 210 may interact directly with the tape as it traverses across the sensor. One embodiment for the mechanical linear sensor may comprise a wheel or gear (or pair of opposing wheels as shown) which is in communication with the surface of the tape or leader 212, whereby the length of the tape may be computed by the logic board 220 as being in proportion to the number of turns of the wheel or gear.

In an alternate embodiment, the linear sensor may be a reflective optical sensor 205 configured to detect either indicators or markings on the surface of the tape or leader. In yet another embodiment, the linear sensor may be a transmissive optical sensor 205 which provides and detects light passing through indicator holes in the tape.

The measurement sensor of the retractable reel, which may include the previously presented linear or rotational sensors, is in communication with the logic board 220. Utilizing signals passed to the logic board, a logic device (ASIC, microcontroller, microprocessor, etc.) can determine the amount of tape deployed from the retractable reel. In addition to the logic device, the logic board 220 includes sensor receiving circuitry and a power source (e.g., battery). Non-limiting examples of sensor receiving circuitry include analog-to-digital convertors, current or voltage measurement circuitry, encoder circuitry, circuitry to support hall-effect sensors, or circuitry to send and receive optical encoder signals.

In order to calibrate either the linear or rotational measurements, the logic device must know a zero-reference point. In some embodiment, this may be accomplished through the inputs of a user interface or power button. In another embodiment, the calibration may be accomplished by activity from the linear or rotational sensors. In yet another embodiment, the zero-reference may be established by a wireless link.

Utilizing a combination of the aforementioned sensors, the computation of the length of tape which has been deployed from the body may be computed by the logic device 225 of the logic board 220. When using a rotational sensor 230, the length of tape deployed is equivalent to the spiral circumference of the tape on the spool multiplied by the number of rotations. The term spiral circumference is used specifically in this application to account for the circumference and diameter of the tape increasing with every wind around the spool. Likewise, it should be understood that the circumference and diameter of the tape wrapped around the spool decreases as the length of deployed tape increases. Using the linear sensor and indicators on the tape, the length of the tape deployed is equivalent to the linear length between indicators multiplied by the number of indicators read. Using a wheeled or geared linear sensor in contact with the tape, the length is equivalent to the rotations of the wheel or gear multiplied by the circumference of the wheel or gear.

A number of optional features are made possible with the addition of electronics to the system. In addition to receiving the sensor signal and computing the length of leader deployed, in the preferred embodiment shown in FIG. 10, the logic device 225 of the logic board 220 includes wireless communication to relay information. The wireless communication (e.g., Bluetooth, Zigbee, etc.) may be received by external devices, for example, a smart phone or remote user interface. In some embodiments, the wireless communication may be bi-directional to the external device. In the preferred embodiment, the logic device may wirelessly broadcast information at specific intervals (similar to a Bluetooth low-energy sensor or beacon) to be received by the external device. Information broadcast wirelessly may include length of tape deployed, battery charge status, compass orientation, measurement angles relative to a fixed position, or GPS positioning information.

Figure 10:
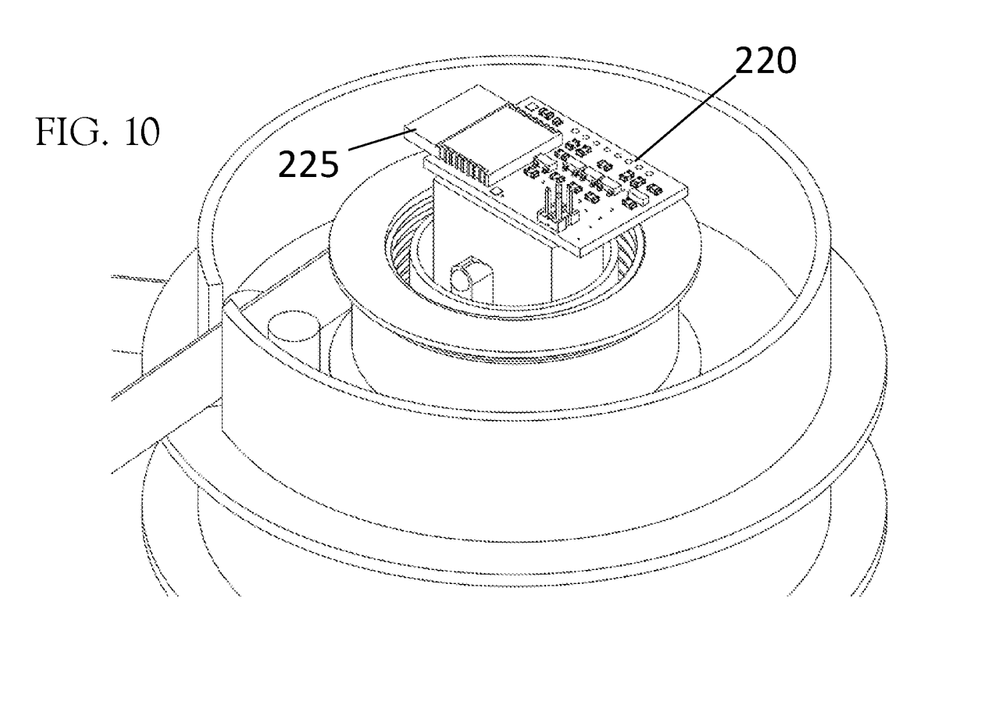
FIG. 10 shows a construction of the concentric mechanism including wireless hardware corresponding to an embodiment of the present disclosure.

In some embodiments a reel may include a magnetometer which provides information to the logic board corresponding to the orientation of the leader being deployed from the reel, thereby providing the logic device positional information including angular measurements relating to points of a compass (i.e., earth's magnetic field). In some cases, a system including a single magnetometer may be sufficient to compute the resulting geometry of the system layout.

In embodiments wherein the logic board 220 includes a GPS chip or module, positional information is available to the logic device. While for some application this positional information may be too coarse relative to measurement requirements, it may be used for logging or evidence purposes. In other applications, and given the improvements in accuracy through technological advance, the GPS positional information may supplement the accuracy of the tape measurement.

The logic board 220 is powered by a battery. In one embodiment the battery may be replaceable by the user (i.e., removable AA, AAA, coin cell, etc.). In other embodiments, the battery may be rechargeable via a connector port (i.e., USB or another type of connector) configured to receive a mating plug capable of providing sufficient power to charge the battery. In the case of a rechargeable battery, the logic board 220 may also include circuitry to enable communication with the logic device for monitoring and regulating the recharging event—in other words, the logic device has knowledge of the battery charge.

An alternative embodiment of the plot measurement system may consist of a pair of vector markers where the first vector marker comprises essentially an origin reel attached to a spike or concentric mechanism and the second vector marker comprises a retractable reel, measurement sensor, and a logic board. With the addition of a magnetometer on the logic board, the configuration is able to provide a detailed vector measurement having both distance and orientation (a.k.a. magnitude and direction).

Figure 11:
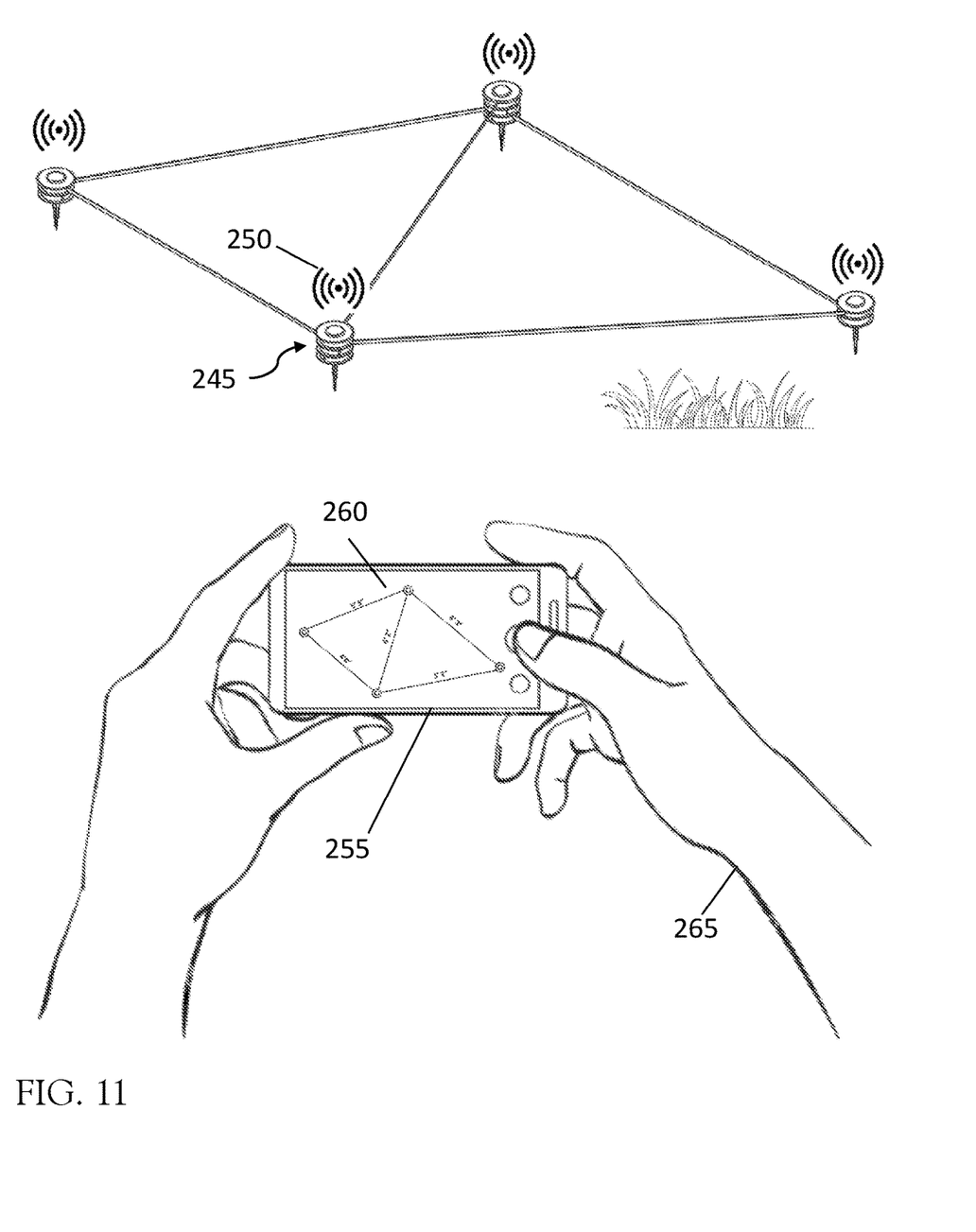
FIG. 11 illustrates the use of an application on a mobile device having a wireless link to a plurality of concentric mechanisms corresponding to an embodiment of the present disclosure.

FIG. 11 illustrates a use model whereby a user 265 can plan, arrange, confirm, and make record of a field plot layout utilizing an application on a mobile device (e.g., smartphone). As shown, a field plot measurement system includes four vertex markers 245 which are positioned in a field. Each vertex marker includes a wireless transmitter and, as a non-limiting example, each vertex marker periodically transmits information including a unique name or identifier (i.e., marker A, B, C, D), the reel configuration (i.e., origin or retractable) of the vertex marker, and length of tape deployed from each retractable reel. Additional information, such as the compass orientation of a leader or the GPS location of a vector marker may be included in the transmitted information.

The mobile device 255 includes a wireless receiver and a display. Additionally, the mobile device may execute an application 260 which receives the wireless information and presents the information to the user in the form of a field plot. In some embodiments, the application includes the ability to record, plan, and document the setup.

Figure 12:
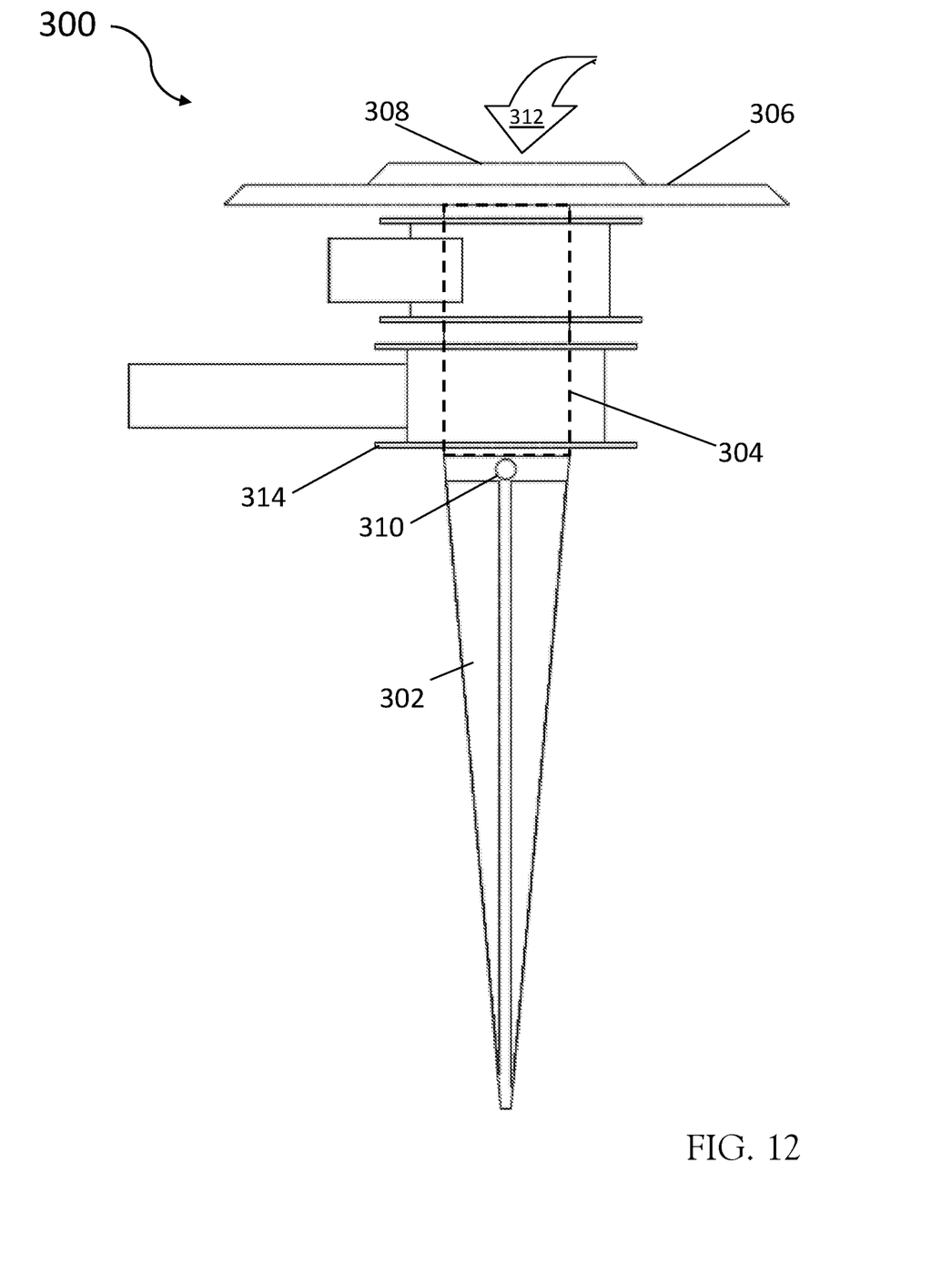
FIG. 12 shows a construction of the concentric mechanism corresponding to an embodiment of the present disclosure.

FIG. 12 highlights another aspect of the construction of the concentric mechanism 300 for improved durability when using a hammer or excessive force to pound the device into hard ground. The concentric mechanism presented thus far includes a spike 302 which is pounded into the ground, a rod 304 which provides an axel for the housing and reels to rotate upon, and as introduced in FIG. 12, a reel housing cap 306 which includes an impact area 308. By making the spike, rod, housing cap, and impact area a unitary body construction, reasonable force 312 can be applied. The bottom reel 314 of the vertex marker can be supported by a pin 310, ridge, or other mechanical means which enable the reel to freely rotate around the rod 304.

Figure 13:
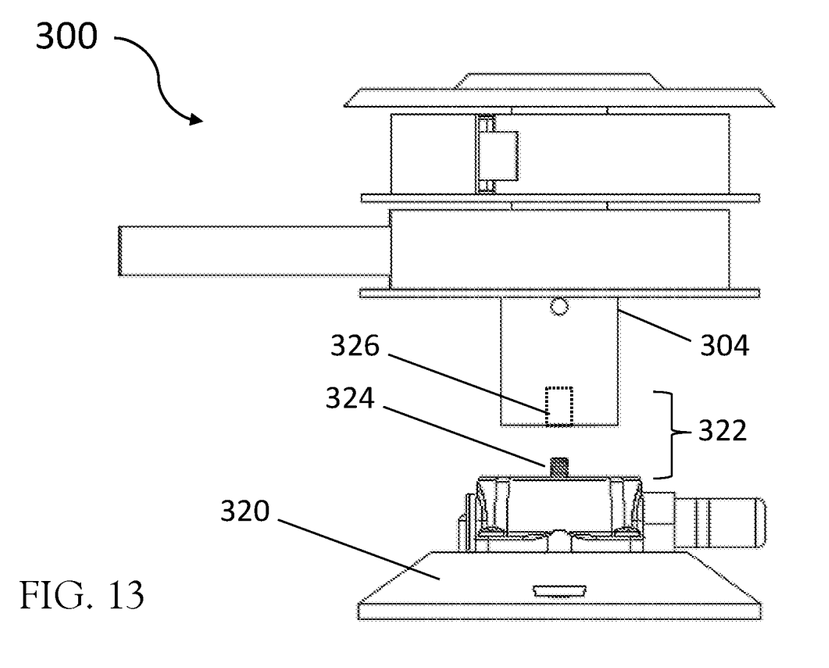
FIG. 13 shows the concentric mechanism having an interchangeable base corresponding to an embodiment of the present disclosure.

As opposed to the spike presented in FIG. 12, the rod 304 of the concentric mechanism 300 may alternatively be configured to connect to various other bases. FIG. 13 illustrates one example of a suction cup base 320 being coupled by means of a mated interconnect 322. An interconnect may be a threaded system, such as that shown in FIG. 13, or another mechanical interconnect, such as a camera mount, including a plug 324 and receiver 326.

Figure 14A:
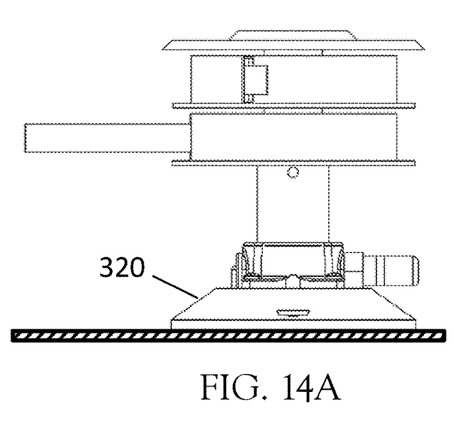
FIGS. 14A, 14B, and 14C show the concentric mechanism having a variety of interchangeable base corresponding to an embodiment of the present disclosure.
Figure 14B:
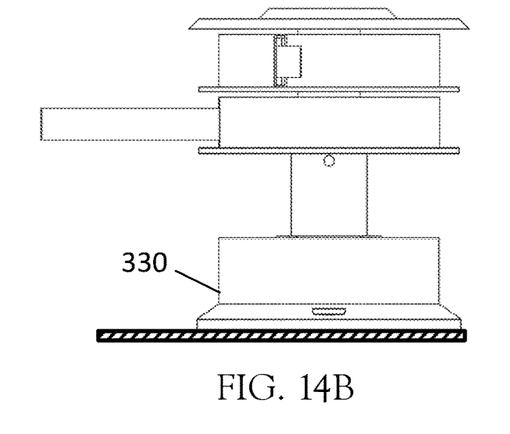
Figure 14C:
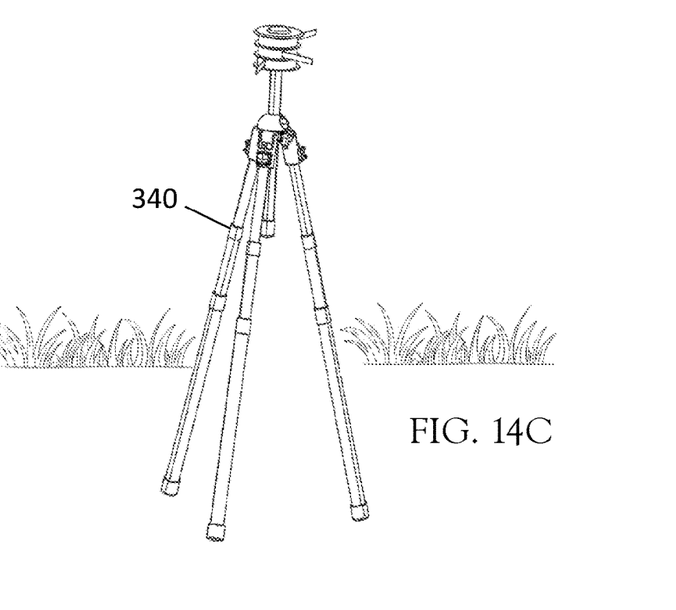

FIGS. 14A, 14B, and 14C illustrate examples of various bases which may be included in the plot measurement system. FIG. 14A illustrates the attached suction cup base, utilizing a suction cup 320, which may be used for glass, marble, and other generally non-porous surfaces. FIG. 14B illustrates a weighted base wherein the weight 330 is sufficient in mass to overcome the spring tension which may exist in a fully deployed plot measurement system. FIG. 14C illustrates a tripod base arrangement, utilizing a tripod 340, which may be used to compensate for uneven surfaces or rough terrain.

As the user begins the measuring process, they will be holding multiple reel assemblies. The tension in the reels will likely not be forceful enough to keep all assemblies locked together as one. One method to keep assemblies attached through the transport and measurement process is via magnetic locks between assemblies. Another embodiment may include mechanical interconnects such as carabiners. Yet a third alternative method may include a carrying tray system.

What is claimed is:

1. A plot measurement system comprising:
    a plurality of vertex markers including a first vertex marker, second vertex marker, and a third vertex marker, wherein each vertex marker comprises two reels selected from the group origin reel and retractable reel,
    wherein the first vertex marker, second vertex marker, and third vertex marker are connected in pairs by an uncommon leader,
    wherein each leader traverses between an origin reel and retractable reel, and each leader has indicia corresponding to the distance between the connected vertex markers.

2. The plot measurement system of claim 1, wherein a first leader connects the first vertex marker and the second vertex marker, a second leader connects the second vertex marker and the third vertex marker, and a third leader connects the third vertex marker and the first vertex marker.

3. The plot measurement system of claim 1, wherein the retractable reel is encased in a housing and the leader extends through an egress in said housing.

4. The plot measurement system of claim 3, wherein the distance between the connected vertex markers is presented by indicia at the egress in the housing of the retractable reel.

5. The plot measurement system of claim 1, wherein the retractable reel includes a spool upon which the leader is wound.

6. The plot measurement system of claim 5, wherein the spool shares an axis with a concentric mechanism, and wherein the spool and concentric mechanism are attached by a spring.

7. The plot measurement system of claim 1, wherein a sensor provides information via an electrical signal corresponding to a length of leader deployed from the retractable reel.

8. The plot measurement system of claim 7, wherein a logic board receives the electrical signal, computes the length of leader deployed, and wirelessly transmits said information.

9. A plot measurement system comprising:
    a plurality of vertex markers including a first vertex marker, second vertex marker, and a third vertex marker, wherein each vertex marker comprises two reels selected from the group origin reel and retractable reel;
    wherein a first leader connects the first vertex marker and the second vertex marker, a second leader connects the second vertex marker and the third vertex marker, and a third leader connects the third vertex marker and the first vertex marker;
    wherein the first leader, second leader, and third leader each traverse between an origin reel and retractable reel and have indicia corresponding to the distance between the connected vertex markers.

10. The plot measurement system of claim 9, wherein the retractable reel comprises a spool upon which the leader is wound, a housing having an egress, and a spring which connects the housing and the spool and is configured to retract the leader onto the spool.

11. The plot measurement system of claim 10, wherein the distance between the originating vector marker and the retracting vector marker is presented by the indicia at the egress of the housing of the retractable reel.

12. The plot measurement system of claim 11, wherein the indicia at the egress is compensated to include the distance between the egress of the housing and the center of the retractable reel.

13. The plot measurement system of claim 10, wherein a sensor provides information via an electrical signal corresponding to a length of leader deployed from the retractable reel.

14. The plot measurement system of claim 9, wherein the vertex marker further comprises a concentric mechanism having an axis upon which both the origin reel and retracting reel rotate freely.

* * * * *